United States Patent
Gauthier et al.

(10) Patent No.: US 11,820,946 B2
(45) Date of Patent: Nov. 21, 2023

(54) PROCESS FOR CONVERTING WASTE PLASTICS IN THE PRESENCE OF A SOLVENT, RESULTING FROM THE CONVERSION OF USED TYRES

(71) Applicant: IFP Energies nouvelles, Rueil-Malmaison (FR)

(72) Inventors: Thierry Gauthier, Rueil-Malmaison (FR); Romina Digne, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 240 days.

(21) Appl. No.: 17/208,626

(22) Filed: Mar. 22, 2021

(65) Prior Publication Data
US 2021/0301145 A1 Sep. 30, 2021

(30) Foreign Application Priority Data
Mar. 26, 2020 (FR) .................................... 20/02.955

(51) Int. Cl.
*C10G 1/10* (2006.01)
*B01D 3/04* (2006.01)
(Continued)

(52) U.S. Cl.
CPC ................. *C10G 1/10* (2013.01); *B01D 3/14* (2013.01); *B01D 11/0492* (2013.01);
(Continued)

(58) Field of Classification Search
None
See application file for complete search history.

(56) References Cited

U.S. PATENT DOCUMENTS 3,704,108 A 11/1972 Alpert
3,978,199 A 8/1976 Maruhnic et al.
(Continued)

FOREIGN PATENT DOCUMENTS

CN 107699270 A * 2/2018 ............... C10G 1/10

OTHER PUBLICATIONS

Machine translation CN107699270. retrieved Jan. 3, 2023 (Year: 2023).*

(Continued)

*Primary Examiner* — In Suk C Bullock
*Assistant Examiner* — Alyssa L Cepluch
(74) *Attorney, Agent, or Firm* — MILLEN, WHITE, ZELANO & BRANIGAN, PC; Ryan Pool

(57) ABSTRACT

The invention relates to a process for converting a plastic feedstock and for converting used tyres to obtain carbon black, comprising the following steps:
a) a solid feedstock (100) based on used tyres is sent into a reaction zone (10) in the presence of a liquid solvent (340) comprising aromatic compounds to at least partly dissolve said solid feedstock and to thermally decompose said dissolved solid feedstock so as to obtain carbon black (160) and a first hydrocarbon-based liquid fraction (120);
b) a molten plastic feedstock (200) is sent together with at least a portion of the first hydrocarbon-based liquid fraction (120) obtained on conclusion of step a) into a conversion zone (20) to dissolve said molten plastic feedstock (200) and to thermally decompose said dissolved plastic feedstock so as to obtain a second hydrocarbon-based liquid fraction (230).

14 Claims, 3 Drawing Sheets

(51) Int. Cl.
*C09C 1/48* (2006.01)
*C10B 53/07* (2006.01)
*B01D 3/14* (2006.01)
*B01D 11/04* (2006.01)

(52) U.S. Cl.
CPC ............ *C09C 1/482* (2013.01); *C09C 1/487* (2013.01); *C10B 53/07* (2013.01); *C10G 2300/1003* (2013.01); *C10G 2300/4081* (2013.01)

(56) References Cited

U.S. PATENT DOCUMENTS

| | | | |
|---|---|---|---|
| 9,920,255 B2 | 3/2018 | Hofer | |
| 2007/0098625 A1* | 5/2007 | Adams | C10G 1/10 423/484 |
| 2009/0036569 A1* | 2/2009 | Gonchar | B29B 17/02 523/307 |
| 2014/0114098 A1* | 4/2014 | Hofer | C10G 1/02 422/198 |
| 2014/0228606 A1* | 8/2014 | Narayanaswamy | B01J 29/40 585/241 |
| 2016/0040074 A1* | 2/2016 | Methling | C08J 11/12 585/16 |
| 2020/0071619 A1* | 3/2020 | Humphreys | C10G 1/083 |

OTHER PUBLICATIONS

Search Report in corresponding FR2002955 dated Dec. 8, 2020 (pp. 1-3).

\* cited by examiner

PROCESS FOR CONVERTING WASTE PLASTICS IN THE PRESENCE OF A SOLVENT, RESULTING FROM THE CONVERSION OF USED TYRES

FIELD OF THE INVENTION

The present invention relates to the integration of a process for converting plastic waste into liquid hydrocarbon fractions with a process for converting used tyres by thermal degradation.

PRIOR ART

Processes for converting used tyres by thermal decomposition are generally directed towards producing gaseous, liquid and solid fractions. The tyre is generally initially ground to obtain either ground tyre material still containing a portion of the textile fibres or metal wires contained in the tyre (typically 10 cm pieces) or granulates (generally less than 5 mm in size) free of textile fibres or metal wires. It is possible to react these feedstocks thus prepared by exposing them to heat to decompose the used tyre and to recover a gaseous fraction, a liquid fraction and a solid fraction. To succeed in decomposing the tyre, it is generally necessary to expose the tyre to a quite high temperature, generally between 300 and 900° C. for reaction times ranging from 30 minutes to several hours.

Numerous technologies exist for performing these reactions. For example, the tyres may be placed in contact with heat in rotating furnaces (Lewandowski et al., Journal of Analytical and Applied Pyrolysis, 140, 2019, 25-53), or in mobile beds (EP2661475). These technologies are robust, but generally require working at quite high temperatures, generally on average above 500° C. In these processes, the carbon black generally present in the feedstock to a proportion of 25-40% by weight and originally consisting of very fine sub-micrometric or micrometric particles/agglomerates, tends to agglomerate in the presence of the decomposed rubber which forms a coke binding these structures at different scales, the solid often leaving the reactor in the form of blocks of several millimetres/centimetres which then need to be finely ground in order to reuse this solid as carbon black, which demands substantial energy expenditure. In these processes, the temperature conditions are high and essentially gaseous and solid fractions are found in the reactor. The liquids produced then result from condensation of the gaseous products downstream of the reactor. These high temperature conditions moreover tend to promote polycondensation and coking reactions to form polyaromatic structures via cyclization reactions involving the aromatic and olefinic structures present (M. F. Laresgoiti, B. M. Caballero, I. de Marco, A. Torres, M. A. Cabrero, M. J. Chomón. J. Anal. Appl. Pyrolysis 71 (2004) 917-934) or coke. The higher the temperature, the greater the contents of polyaromatic structures formed and of coke formed.

Now, while aromatic molecules are, firstly, good solvents and, secondly, find numerous applications, notably as petrochemical bases, polyaromatic structures are, on the other hand, prejudicial to the quality of the liquid formed and very difficult to refine or to convert. Furthermore, they are ideal coke precursors. There is thus every interest in seeking to minimize polycondensation reactions in order to produce a minimum of polyaromatic structures while preserving the monoaromatic structures present.

To improve the quality of the solid phase and to limit the formation of coke on carbon black, it is possible to lower the partial pressure of hydrocarbon by injecting steam during the cracking reactions which nevertheless require a high temperature above 500° C. to perform the cracking under essentially gas-solid conditions (US 2016/0083657). These gas-solid processes generally induce productions of uncondensable gases under the atmospheric conditions, these productions being very high and between 10% and 25% by weight relative to the tyre feedstock entering the reactor. However, upgrading of reaction gases is locally complex. These gases are thus generally used to produce the heat required to perform the reactions, but this is done at the expense of the amount of readily upgradable liquid products, which is then limited. These liquid fractions are, specifically, subsequently optionally upgraded to produce new hydrocarbon cuts (naphtha, gasoline, kerosene, gas oil, vacuum distillate, residues) used in a refinery to produce fuels or in petrochemistry to produce bases subsequently serving for the production of plastics. It is nevertheless necessary to refine these cuts in order to bring them to the desired specifications. The more numerous the polyaromatic structures, the more complex the refining.

An alternative route consists in placing the tyre feedstocks in contact with a liquid, raising the temperature of this liquid and dissolving and converting the tyres into a homogeneous liquid phase in which the tyre feedstock is stirred and gradually disappears. An example of this implementation is given in U.S. Pat. Nos. 3,978,199 and 3,704,108. This type of process makes it possible to recover carbon black in the liquid phase after filtration without these particles having undergone agglomeration or deposition of coke at their surface, as is the case in the reactions operating in the gas-solid phase. Implementation under limited temperature conditions below 450° C. moreover limits the polycondensation reactions of the aromatics, the formation of coke at the surface of the carbon black particles and the formation of gases, which is generally between 1% and 7% by weight of the entering feedstock. The implementation of a solvent containing aromatic fractions, preferentially monoaromatic fractions, is favourable and enables better dissolution of the feedstock in the reactor. As tyres are, naturally, composed of various rubbers including large amounts of synthetic rubber composed of styrene-butadiene rubbers (SBR), the liquid fractions produced contain large amounts of aromatics and it may be advantageous to separate and recycle a portion of the liquid formed during the reaction to use it as solvent, while the liquid fraction that is not recycled may be sent to a refinery to be refined and then upgraded as a hydrocarbon cut to feed the product pools or petrochemistry.

It should be pointed out that these processes for processing used tyres are generally dispersed over the territory and consist of facilities with limited capacities, typically between 5 and 50 kilotonnes/year of entering tyres.

Waste plastics are present in large amount in the post-consumer channels. There are many channels (packaging, electrical and electronic equipment waste, agriculture, automobile, building, toys) that are characterized by specific collection organizations and methods. Depending on the use, the major plastic resins used, namely polyolefins (polyethylene and polypropylene), polyvinyl chloride (PVC), polyethylene terephthalate (PET), polyurethanes, polystyrene and also many other plastics in smaller amount are found in the channels. The waste plastics that are collected in these channels are generally sorted and result in streams of materials containing essentially one resin, for example PET or PVC or polyethylene, the recycling of which may be envisaged either mechanically or chemically to remake reusable plastic resins. On conclusion of the collection and sorting, there are also streams of mixed plastics, for which recycling to make plastic resins cannot be envisaged because it is too complex and thus too expensive. In this case, other upgrading routes may be more pertinent, such as thermal decomposition, also known as cracking, or pyrolysis, which may be implemented in the presence or absence of a catalyst (Chika Muhammad, Jude A. Onwudili, and Paul T. Williams, Energy Fuels 2015, 29, 2601-2609), these routes generally being performed in the absence of a solvent that is liquid under the reaction conditions. However, in U.S. Pat. No. 9,920,255, a process using a liquid solvent is used to facilitate the reaction procedure, and it is clearly specified that this liquid solvent is imported and is petroleum-based, its aromatic content needing to be greater than 25%. The use of aromatic cuts such as light cycle oil cuts or heavy cycle oil cuts which are produced in refineries is in effect possible. However, the use of these solvents poses several problems, in particular when the processing site is a site with limited capacity (for example between 5 and 50 kilotonnes/year (kt/y]) and which is delocalized far from a refinery. These solvents are then not available on the site and are expensive to convey. Furthermore, the use of solvents obtained directly from the oil refinery would contribute towards diluting products obtained from recycling with virgin fossil products.

The thermal decomposition of plastics makes it possible to produce liquid fractions which are subsequently optionally upgraded to produce new hydrocarbon cuts (naphtha, gasoline, kerosene, gas oil, vacuum distillate, residues) which may be used in a refinery to produce fuels or in petrochemistry to produce bases subsequently serving for the production of plastics. Upgrading these produced cuts nevertheless requires these cuts to be refined downstream in order to bring them to the desired specifications. In this perspective, it is desirable to avoid processing plastics containing hetero-elements, such as PVC which contains halogenated materials, or plastics such as PET and polyurethanes which contain a lot of oxygenated materials and whose chemical structure promotes coke production. It is thus well known that to produce liquid fractions by thermal or catalytic decomposition, the most advantageous plastics are polyolefins and polystyrene. There are numerous streams predominantly containing polyolefins that are difficult to recycle mechanically and which can thus be converted by thermal or catalytic decomposition. Mention will be made, for example, of streams of agricultural plastic films or mixed plastic films collected from household waste.

Processes for the thermal decomposition of plastics have been well known for many years. The implementation may be performed in various ways, for example in perfectly stirred reactors (DE 19702539, WO 2011/077479), in rotating furnaces, in dies driven by endless screws or in fluidized beds. The implementation of the thermal decomposition of polyolefins in a perfectly stirred reactor in the liquid phase is relatively complex in the absence of an added solvent that is liquid under the reaction conditions; in point of fact, it is first necessary to melt the plastic (for example in an extruder) and then to mix the molten plastic with the products that have reacted, which is complex since the decomposition of the polyolefins leads essentially to the formation of long hydrocarbon-based paraffin and olefin chains, which lead to liquids of high viscosity which set easily in low temperature zones. These molecules moreover have a polyolefin-dissolving power that is much more limited than that of aromatic molecules. Controlling the transfers (heat, material), the temperature and the stirring in the reaction medium is thus complex. To overcome all this, it is common practice to perform the reactions at sufficiently high temperatures, above 450° C., to limit the heat transfer problems and the stirring problems. However, under these conditions, the polycondensation and coking reactions and the production of gases become increasingly substantial when the reaction temperature increases.

As for used tyres, it should be pointed out that these processes for processing waste plastics generally concern small capacities of less than 50 kilotonnes/year, since waste plastics are generally dispersed over the territory as a function of the consumption, and transportation of the waste is expensive since the density of solid waste, even compacted, remains low. It is thus advantageous to process waste close to sorting centres in order to minimize the transportation. The conversion of used tyres or of waste plastics into liquid fractions by thermal decomposition makes it possible to densify the material and makes the transportation of the liquid fraction for upgrading more economical.

It should be pointed out, however, that on conclusion of the conversion of the waste plastics, the quality of the liquid resulting from the conversion is insufficient for the liquid to be upgradable directly into fuel, petrochemical base or product. Subsequent refining steps often combining distillation, catalytic conversion, hydrogenation or hydrotreating are required to adjust the cut points, the content of hetero-elements or the chemical structure. To be economically advantageous, these steps can only be envisaged in refineries or petrochemical platforms in which the processes exist and which have very large capacities, often of the order of a million tonnes per year.

To overcome all these drawbacks, the Applicant has developed a novel process combining the upgrading of used tyres with the upgrading of waste plastics by thermal decomposition, this process being characterized in that the liquid products from the decomposition of tyres, which contain aromatic compounds, and more particularly monoaromatic compounds, are used to serve as solvent during the step of thermal decomposition of the waste plastics. The use of this solvent, which is maintained essentially liquid under the thermal decomposition reaction conditions, makes it possible to limit the temperature at which the thermal decomposition is performed, typically to a temperature of less than or equal to 425° C. in the zone for the thermal decomposition of the used tyres and to a temperature of less than or equal to 450° C. in the zone for the thermal decomposition of the waste plastics. This then makes it possible to limit the production of uncondensable gases containing from 1 to 4 carbon atoms to a level of less than 5% by weight relative to the total weight of the solid feedstock. The process according to the invention also makes it possible to maximize the production of carbon black resulting from the thermal decomposition of used tyres, which is separated from the liquid before being placed in contact with the waste plastic.

SUBJECTS OF THE INVENTION

The present invention relates to a process for converting a plastic feedstock and for converting used tyres to obtain carbon black, comprising at least the following steps:

a) a solid feedstock based on used tyres is sent into a reaction zone in the presence of a liquid solvent comprising aromatic compounds to at least partly dissolve said solid feedstock and to thermally decompose at a temperature of less than or equal to 425° C. said at least partially dissolved solid feedstock so as to obtain at least carbon black and a first hydrocarbon-based liquid fraction;

b) a molten plastic feedstock is sent together with at least a portion of the first hydrocarbon-based liquid fraction obtained on conclusion of step a) into a conversion zone to at least partly dissolve said molten plastic feedstock and to thermally decompose at a temperature of less than or equal to 450° C. said partially dissolved plastic feedstock so as to obtain at least partly a second hydrocarbon-based liquid fraction.

Advantageously, said process also comprises the following steps:

c) the hydrocarbon-based liquid fraction obtained from step a) is at least partly sent to a fractionation zone to obtain at least one intermediate hydrocarbon cut whose initial boiling point is between 250 and 325° C. and whose final boiling point is between 350 and 450° C., a light cut and a heavy cut;

d) a fraction of the intermediate hydrocarbon cut is at least partly sent to the reaction zone of step a) as liquid solvent.

Advantageously, said first hydrocarbon-based liquid fraction has a content of aromatic compounds of between 30% and 70% by weight relative to the total weight of said first liquid fraction.

Advantageously, said intermediate hydrocarbon cut has a content of aromatic compounds of between 30% and 70% by weight relative to the total weight of said hydrocarbon cut.

Advantageously, a portion of the second hydrocarbon-based liquid fraction is sent to the fractionation zone.

Advantageously, a fraction of the intermediate hydrocarbon cut is at least partly sent to the conversion zone as additional liquid solvent.

Advantageously, the intermediate hydrocarbon cut is at least partly sent to an aromatic compound enrichment unit to obtain a stream rich in aromatic compounds and a stream depleted in aromatic compounds, said stream rich in aromatic compounds being sent into the reaction zone as liquid solvent.

Advantageously, said stream rich in aromatic compounds is at least partly sent to the conversion zone as additional liquid solvent.

Advantageously, said aromatic compound enrichment unit is chosen from units for extraction with the solvent furfural, phenol or N-methyl-2-pyrrolidone.

Advantageously, said plastic feedstock is a mixture of plastics containing at least 90% by weight of polyolefins and of polystyrene relative to the total weight of said feedstock.

Advantageously, the first hydrocarbon-based liquid fraction and/or the second hydrocarbon-based liquid fraction comprises at least 40% by weight of compounds whose initial boiling point is greater than 300° C.

Advantageously, the ratio between the flow rate of the liquid solvent and the flow rate of said solid feedstock that are injected into the reaction zone is between 1 and 10 weight/weight.

Advantageously, the ratio between the sum of the flow rates of the hydrocarbon-based liquid fraction and the additional liquid solvent divided by the flow rate of the molten plastic feedstock is between 1 and 10 weight/weight.

In one embodiment according to the invention, step a) comprises the following substeps:

a1) said solid feedstock and said liquid solvent are sent into a first stirred reactor to at least partly dissolve said solid feedstock;

a2) said at least partly dissolved solid feedstock obtained on conclusion of step a1) is sent into a second stirred reactor to thermally decompose at a temperature of less than or equal to 425° C. said solid feedstock and to obtain a liquid effluent containing carbon black particles in suspension;

a3) said liquid effluent obtained on conclusion of step a2) is cooled to a temperature of less than 150° C.;

a4) the carbon black particles are filtered off, washed and separated from the cooled liquid effluent obtained on conclusion of step a3) to obtain carbon black and a first hydrocarbon-based liquid fraction.

Advantageously, step b) comprises the following substeps:

b1) said molten plastic feedstock and at least a portion of the first hydrocarbon-based liquid fraction are sent into a first stirred reactor to at least partly dissolve said molten plastic feedstock;

b2) said at least partly dissolved plastic feedstock obtained on conclusion of step b1) is sent into a second stirred reactor to thermally decompose at a temperature of less than or equal to 450° C. said plastic feedstock and at least partly to obtain a second hydrocarbon-based liquid fraction.

BRIEF DESCRIPTION OF THE DRAWINGS

The references in FIGS. 2 and 3 which are identical to those of FIG. 1 denote the same elements.

DETAILED DESCRIPTION OF THE INVENTION

Figure 1:
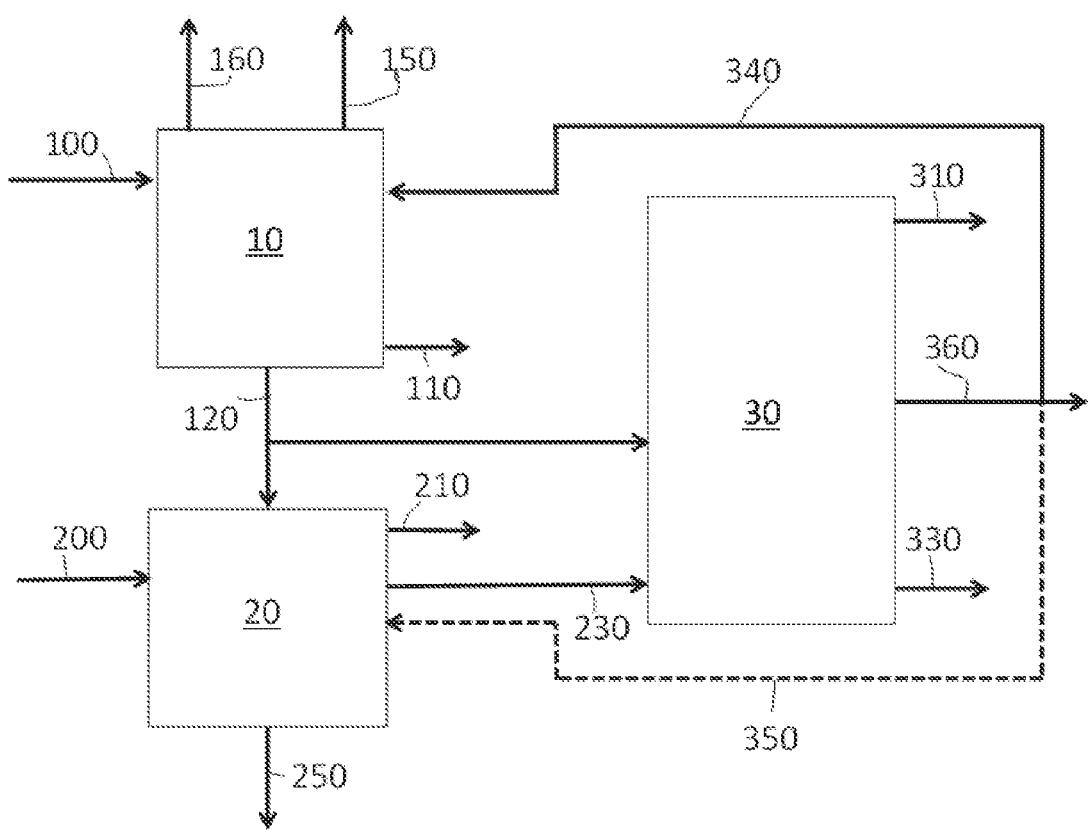
FIG. 1 is a schematic representation of the process according to the invention according to one embodiment.

According to the invention, the process for converting a plastic feedstock and for converting used tyres to obtain carbon black comprises at least the following steps (FIG. 1):

a) a solid feedstock 100 based on used tyres is sent into a reaction zone 10 in the presence of a liquid solvent 340 comprising aromatic compounds to at least partly dissolve said solid feedstock and to thermally decompose at a temperature of less than or equal to 425° C., preferably between 375 and 425° C., said at least partially dissolved solid feedstock so as to obtain at least carbon black 160 and a first hydrocarbon-based liquid fraction 120;

b) a molten plastic feedstock 200 is sent together with at least a portion of the first hydrocarbon-based liquid fraction 120 obtained on conclusion of step a) into a conversion zone 20 to at least partly dissolve said molten plastic feedstock 200 and to thermally decompose at a temperature of less than or equal to 450° C., preferably between 375 and 425° C., said partially dissolved plastic feedstock so as to obtain at least partly a second hydrocarbon-based liquid fraction 230;

c) the first hydrocarbon-based liquid fraction 120 obtained from step a) is optionally at least partly sent to a fractionation zone 30 to obtain at least one intermediate hydrocarbon cut 360 (also referred to herein as the intermediate fraction or intermediate cut) whose initial boiling point is between 250 and 325° C. and whose final boiling point is between 350 and 450° C., a light cut and a heavy cut;

d) a fraction of the intermediate hydrocarbon cut 360 is optionally at least partly sent to the reaction zone 10 of step a) as liquid solvent 340;

e) a fraction of the intermediate hydrocarbon cut 360 is optionally at least partly sent to the reaction zone 20 of step b) as additional liquid solvent 350;

f) the second hydrocarbon-based liquid fraction 230 obtained from step b) is optionally at least partly sent to the fractionation zone 30.

The solid feedstock 100 used in the context of the present invention is advantageously based on tyres resulting from the processing of used tyres which may originate from any source, for instance light vehicles (LV) or heavy goods vehicles (HGV). Said solid feedstock may advantageously be in the form of tyre granulates, i.e. in the form of particles less than 5 mm in size and substantially free of textile fibres and metal wires, and/or of ground tyre materials, i.e. pieces of ground tyres, with a characteristic size generally less than 20 cm and not free of textile fibres and metal wires.

During step a) of the process, the rubber contained in the solid feedstock based on used tyres is dissolved on contact with a liquid solvent 340 and is then thermally decomposed. In the course of the dissolution and of the thermal decomposition, step a) is preferably performed at a temperature of less than or equal to 425° C., preferably at a temperature of between 375 and 425° C. On conclusion of step a), the solid materials contained in the tyre waste are released and separated from the hydrocarbon-based liquid fraction 120 obtained on conclusion of this step. The carbon black 160 and optionally other undissolved solid materials present, such as the metal wires 150, are thus recovered on conclusion of step a). Advantageously, the gaseous fractions 110 are evacuated from the reaction zone 10 and may optionally be used to produce part of the energy required for the process.

During step b) of the process according to the invention, a molten plastic feedstock 200 is sent together with at least a portion of the first hydrocarbon-based liquid fraction 120 obtained on conclusion of step a) into a conversion zone 20 to at least partly dissolve said molten plastic feedstock 200 and to thermally decompose at a temperature of less than or equal to 450° C., preferably between 375 and 425° C., said partially dissolved plastic feedstock so as to obtain at least partly a second hydrocarbon-based liquid fraction 230.

The plastic feedstock 200 comprises, and is preferably constituted of, a mixture of plastics containing at least 90% by weight of polyolefins (for example polyethylene, polypropylene) and of polystyrene relative to the total weight of said feedstock, the remaining 10% by weight possibly containing at least 80% of other plastics and impurities that may be present, for instance paper, cardboard, textile fibres, metals, or any other solid feedstock that might be present in the waste.

Preferentially, the plastic feedstock 200 has been pre-shredded into fractions with a characteristic size (longest dimension) of less than 10 cm, preferentially less than 2 cm and even more preferentially less than 1 cm.

Before it is introduced into the conversion zone 20, the plastic feedstock 200 is first melted at a temperature generally between 100 and 250° C., preferentially between 100 and 180° C., depending on the nature and the composition of the plastic feedstock. The molten plastic feedstock 200 is then placed in contact with at least a portion of the hydrocarbon-based liquid fraction 120 resulting from the conversion of the used tyres, and optionally with an additional liquid solvent 350 to perform the thermal decomposition of the plastic feedstock at a temperature of less than 450° C., preferably between 350 and 425° C. Advantageously, the fractions of the plastic feedstock that have not melted and any solid reaction residues are recovered via line 250. Advantageously, the gaseous fractions 210 resulting from the thermal decomposition are evacuated from the conversion zone 20 and may optionally be used to produce part of the energy required for the process.

In one embodiment according to the invention, the hydrocarbon-based liquid fraction 120 obtained from step a) is at least partly sent to a fractionation zone 30 to obtain at least one intermediate hydrocarbon cut 360 whose initial boiling point is between 250° C. and 325° C. and whose final boiling point is between 350° C. and 450° C. Preferentially, the fractionation zone 30 makes it possible to produce at least one light fraction 310 whose final boiling point will preferentially be between 250° C. and 325° C., an intermediate fraction 360 whose initial boiling point will preferentially be between 250° C. and 325° C. and whose final boiling point will preferentially be between 350° C. and 450° C., and at least one heavy fraction 330 whose initial boiling point will preferentially be between 350° C. and 450° C.

In a preferred embodiment according to the invention, a fraction of the intermediate hydrocarbon cut 360 is at least partly sent to the reaction zone 10 of step a) as liquid solvent 340. Preferably, the ratio between the flow rate of the liquid solvent 340 and the flow rate of the solid feedstock 100 that are injected into the reaction zone 10 is between 1 and 10 weight/weight (wt/wt), preferentially between 3 and 5 wt/wt. Specifically, one of the characteristics of the intermediate cut 360 and of the hydrocarbon-based liquid fraction 120 obtained from the reaction zone 10 is that they contain, respectively, an aromatic content of between 30% and 70% by weight relative to the total weight of the intermediate cut or of the hydrocarbon-based liquid fraction, preferentially between 40% and 60% by weight, said fractions comprising a content of at least 70% by weight, preferentially of at least 80% by weight of monoaromatic compounds relative to the total weight of aromatic compounds, making it possible to efficiently dissolve the solid feedstock 100 and to efficiently reduce the viscosity of the reaction medium in the conversion zone 20. Another advantage of the process according to the invention is that the use of the intermediate cut 360 whose boiling point is relatively high (above 250° C.) as liquid solvent 340 or 350 makes it possible to limit the pressure in the reactors to a level below 1.5 MPa taking into account the limited production of gases and of light hydrocarbons in the reaction zone 10 and the conversion zone 20.

Advantageously, the intermediate fraction 360 is also at least partly sent to the conversion zone 20 of step b) as additional liquid solvent 350 to be mixed with the molten plastic feedstock and thus to flux the reaction medium in the conversion zone 20. Preferably, the sum of the flow rates of hydrocarbon-based liquid fraction 120 and of additional liquid solvent 350 divided by the flow rate of the molten plastic feedstock 200 is between 1 and 10 wt/wt, preferentially between 1.5 and 3 wt/wt. Depending on the ratio between the solid feedstock 100 and the plastic feedstock 200, the liquid fluxing the conversion zone 20 will preferentially be the hydrocarbon-based liquid fraction 120 originating from the reaction zone 10, if necessary supplemented with an additional solvent 350 originating from the intermediate fraction 360 obtained from the fractionation zone 30.

Figure 2:
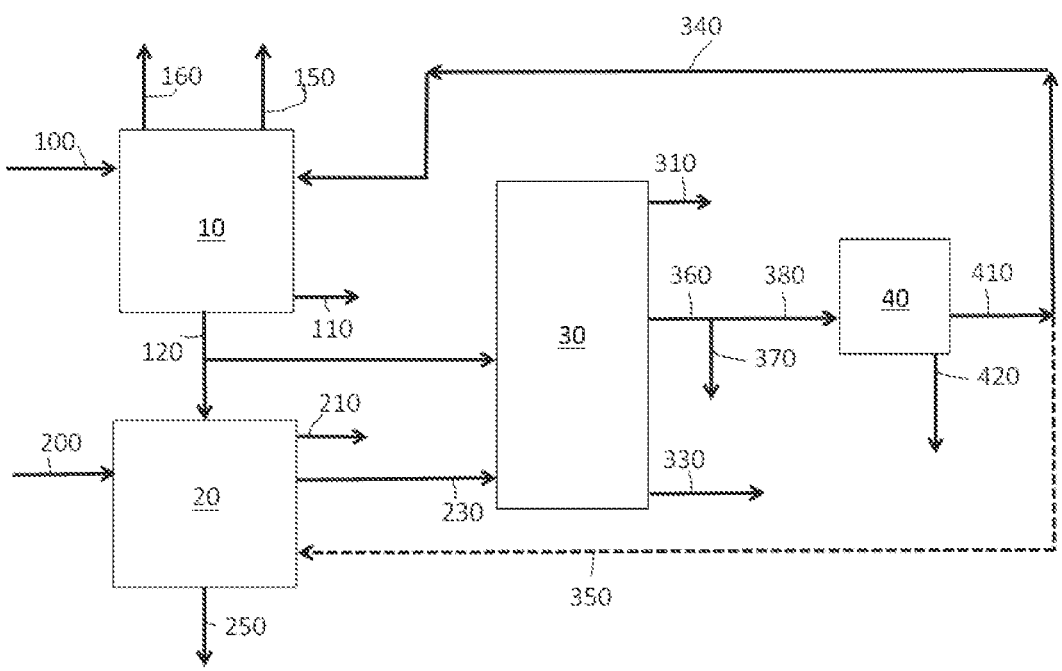
FIG. 2 is a schematic representation of the process according to the invention according to another embodiment.

In one embodiment according to the invention, in order to enrich the liquid fraction recycled into the reaction zone 10 and optionally into the conversion zone 20, it is possible to use, downstream of the fractionation zone 30, a unit 40 for enriching the recycled fraction with aromatics, as represented, for example, in FIG. 2. The intermediate fraction 360 obtained from the fractionation zone 30 is separated into at least two streams, a first stream 370 which is not recycled, and a second stream 380 which is sent into the aromatic compound enrichment unit 40 for producing a cut 410 rich in aromatic compounds, intended to be used as liquid solvent 340 for the reaction zone 10 and optionally as additional liquid solvent 350 for the conversion zone 20, and another cut 420 depleted in aromatics which is not recycled as solvent and which may optionally be mixed with the first stream 370. The unit 40 may be constituted by any separation means which makes it possible to obtain an aromatic-rich stream, for instance a process of extraction with the solvent furfural, phenol or N-methyl-2-pyrrolidone, also known as NMP.

The fractions 310, 420, 370 and 330 which are not recycled may optionally be mixed, before being transported to a processing complex, which is on-site or remote, for refining said fractions. These fractions are characterized in that they contain only constituents obtained from the recycling of plastic waste and of used tyres.

Figure 3:
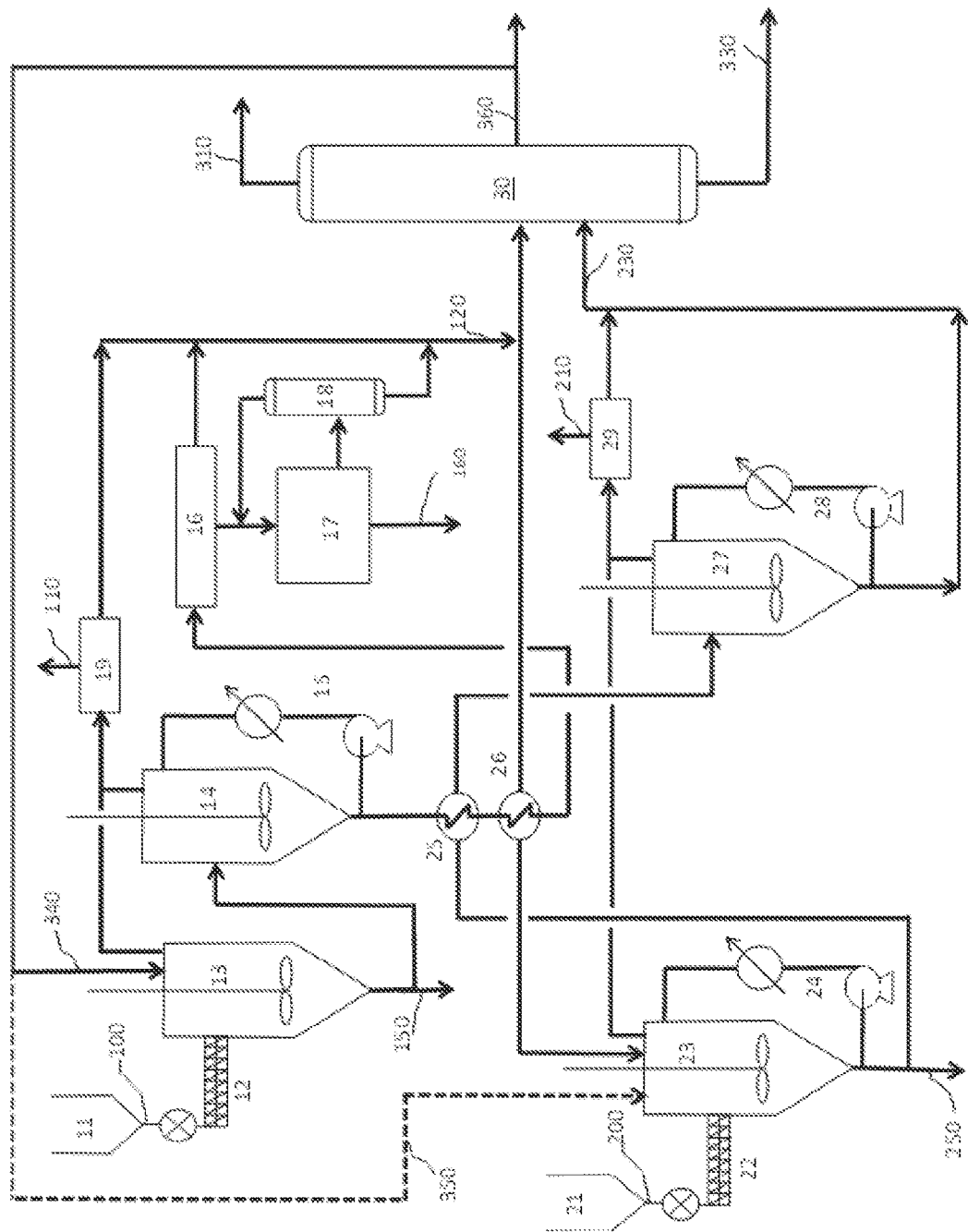
FIG. 3 is a detailed schematic representation of the process according to the invention as illustrated in FIG. 1.

In order to better understand the invention, the description given below as an application example concerns a process for converting a plastic feedstock and for converting used tyres which makes it possible to maximize the recovery of carbon black. With reference to FIG. 3, the reaction zone 10 for the thermal degradation of used tyres comprises a silo 11 containing the used tyre feedstock connected to a first stirred reactor 13 via an endless screw 12 for feeding the reactor 13. This first reactor is fed with liquid solvent 340 and is directed towards promoting the dissolution of the tyre granulates or ground material contained in the solid feedstock 100. The temperature in the reactor 13 is preferentially between 200° C. and 300° C., preferentially between 250° C. and 280° C. In the reactor 13, the ground material or granulates are dissolved. The time required to perform this dissolution is preferentially between 30 minutes and 2 hours. The rubber pieces, and the carbon black which gradually becomes released from the rubber, remain in suspension by means of mechanical stirring as shown in FIG. 3 or hydrodynamic stirring, induced, for example, by an ascending stream of liquid resulting from recirculation by forced convection, or by any other means for keeping the medium stirred. The metal wires or textile fibres 150, which may be present in the solid feedstock and which have not been dissolved, sediment and leave the reactor 13 via the bottom. Under these conditions, the temperature is too low for the carbon-carbon cracking reactions to start significantly and only the cross-linking bonds between polymers, such as the S—S bonds associated with the vulcanization of the rubbers, can crack substantially. The liquid fraction obtained containing the residual solid materials in suspension is directed towards a second stirred reactor 14 in which the thermal degradation reactions are performed under moderate temperature conditions, i.e. at a temperature of less than or equal to 425° C., preferably between 375° C. and 425° C., and for a limited time (corresponding to the residence time of the liquid fraction in the reactor 14) preferentially between 30 minutes and 2 hours, preferentially between 45 minutes and 90 minutes. The amount of heat required to perform the thermal degradation reactions may be provided by an exchanger located on a pump-around 15 around the reactor 14 as shown in FIG. 3, or by any other means such as an exchanger on the wall of the reactor or an exchanger or a furnace on the feedstock upstream of the reactor, for example. Stirring is maintained in the reactor 14 by means of a mechanical stirring system as shown in FIG. 3 or by the pump-around 15 system or by any other means known to those skilled in the art. Preferentially, the pressure of the reactor is maintained at a level below 1.5 MPa by means of a regulating valve (not shown in the figures). Advantageously, the gaseous effluents of the reactors 13 and 14 are partially condensed in a separation zone 19 so as to obtain a gaseous stream 110 and a liquid stream which is then advantageously mixed with the other liquid streams obtained from the reaction zone 10 to form the stream 120. The bulk of the gaseous products are produced in the second reactor 14 where the majority of the thermal degradation reactions takes place.

The liquid effluent containing the carbon black particles in suspension is advantageously cooled in exchangers 25, 26, which moreover make it possible to advantageously heat the liquid streams circulating in the conversion zone 20 comprising the reactors 23 and 27 as shown in FIG. 3. At the outlet of the exchangers 25 and 26, the temperature is low enough to allow filtration of the carbon black particles, for example on a rotary filter 16, preferentially functioning at a temperature of between 50° and 200° C. Next, the carbon black cake obtained is washed in a washing-drying unit 17 with a light aromatic solvent such as toluene, at a temperature preferentially between 50 and 100° C., making it possible to recover the carbon black 160. The light aromatic solvent may then be recovered at the top of a distillation column 18. The carbon black 160 separated out, washed and dried can then advantageously be pelletized with water to form pellets of a few millimetres for example to facilitate its transportation and upgrading. The carbon black thus produced can be used again in the elastomer industry as a reinforcing agent, or as a pigment for other applications, for example in inks or paints, after steps of subsequent processing and packaging of the material as a function of the uses and applications.

The hydrocarbon-based liquid fraction 120 separated directly from the filtration of the carbon black after the rotary filter 16, extracted from the filter cake then leaving the bottom of the distillation column 18 or obtained by condensation of the gaseous effluents of the reactors 13 and 14 is then at least partly directed towards the plastics conversion zone 20, after having been heated in the exchanger 26 to a temperature of between 160 and 300° C. It may optionally be at least partly directed towards the fractionation zone 30. The distribution between the two streams depends on the need for solvent to flux the molten plastic feedstock, as mentioned above.

A portion of the gaseous effluents 110 may also be collected, for example in a flash vessel at atmospheric pressure located on the light cut 310 downstream of the fractionation zone 30 (not shown in FIG. 3).

As described previously, one of the advantages of the invention is that it uses the liquid produced during the thermal decomposition of the used tyres to perform the thermal decomposition of the plastics at a lower temperature than that conventionally used in the prior art (i.e. at a temperature below 450° C.) to maximize the liquid fractions produced while at the same time conserving the quantity and quality of the liquid products by means of limiting the polycondensation reactions leading to the formation of polyaromatic compounds, and limiting the production of gases and of coking reactions. Specifically, the liquid fraction resulting from the conversion of the used tyres contains significant proportions of aromatic compounds which are good solvents for the molten plastics and will make it possible to flux the reaction medium and thus to promote the material and heat transfers. The hydrocarbon-based liquid fraction 120 leaving the reaction zone 10 at the rotary filter 16 or at the bottom of the separation column 18 is at least partly directed towards the conversion zone 20 with a ratio between the sum of the liquid flow rates of the stream 120 (and optionally 350) and the flow rate of plastic feedstock 200 advantageously between 1 and 10 wt/wt, preferentially between 1.5 and 3 wt/wt. If the amount of liquid produced in the reaction zone 10 is larger, then at least a portion of the hydrocarbon-based liquid fraction 120 may be directed towards the fractionation zone 30. In contrast, if the amount of hydrocarbon-based liquid fraction produced in the reaction zone 10 is insufficient, then a portion of additional liquid solvent 350 obtained from the intermediate cut 360 produced in the fractionation zone 30 may be used for this purpose to make up the liquid stream required for fluxing the plastic feedstock.

The conversion zone 20 enabling the thermal decomposition of the molten plastic feedstock 200 comprises a silo 21 containing the waste plastic feedstock connected to a first stirred reactor 23 via an endless screw 22 for feeding the reactor 23. Preferentially, in this endless screw 22, the waste plastic is melted, by means of heating means in the wall of the screw 22 which is kept loaded. The temperature is preferentially adjusted and generally between 100 and 250° C., preferentially between 150 and 180° C. depending on the nature and composition of the plastic feedstock. The reactor 23 is fed with hydrocarbon-based liquid fraction 120 and optionally with additional liquid solvent 350 to promote the dissolution of the plastic feedstock, its mixing and its dispersion in a medium of low viscosity. The temperature in the reactor 23 is preferentially between 150 and 300° C. depending on the nature of the plastics, and, in the case of mixtures, the temperature will preferentially be adjusted to between 250 and 300° C., which makes it possible to dissolve all of the plastics present. The time required to perform this dissolution is preferentially between 30 minutes and 2 hours. The insoluble materials are placed in suspension by means of mechanical stirring as shown in FIG. 3 or hydrodynamic stirring, for example induced by a pump-around 24. The insoluble solid materials in suspension are then evacuated, for example at the outlet at the bottom of the reactor 23 by decantation 250. Under these conditions, the temperature is too low for the carbon-carbon cracking reactions to start significantly and only the crosslinking bonds between polymers can crack substantially (in effect, certain polyethylenes, for example, may be crosslinked).

The amount of heat required for the dissolution and mixing in the reactor 23 is induced by exchanges that can be achieved either by heating the hydrocarbon-based liquid fraction 120, or even 350, by means of an exchanger such as the exchanger 26 shown in FIG. 3, or by exchange on the pump-around 24 or by heating the wall of the reactor 23 or on the endless screw 22.

The liquid product obtained is then evacuated to a second reactor 27 after having optionally been heated in an exchanger 25 for increasing the temperature of the liquid to a temperature advantageously below 450° C. In the reactor 27, the thermal degradation reactions continue under moderate temperature conditions, i.e. at a temperature of less than or equal to 450° C., preferentially between 375° C. and 425° C., and for a limited time corresponding to the residence time of the liquid fraction in the reactor 27, preferentially between 30 minutes and 6 hours, preferentially between 1 hour and 4 hours. The amount of heat required for the reaction may be provided by an exchanger located on a pump-around around the reactor 28 as shown in FIG. 3, or by any other means such as an exchanger on the wall of the reactor or a furnace upstream of the reactor. Stirring in the medium is maintained by means of a mechanical stirring system as shown or by a pump-around system 28 or by any other means known to those skilled in the art for maintaining a uniform temperature in the reactor and for promoting the transfers. Preferentially, the pressure of the reactor 27 is maintained at a level below 1.5 MPa by means of a regulating valve (not shown in the figures). The gaseous effluents from the reactors 23 and 27 are partially condensed in a separation zone 29 so as to obtain a gaseous stream 210 and a liquid stream which is then advantageously mixed with the liquid stream obtained from the reactor 27 to form the stream 230. The bulk of the gaseous products are produced in this second reactor 27 where the vast majority of the thermal degradation reactions takes place.

A portion of the gaseous effluents 210 may also be collected, for example in a flash vessel at atmospheric pressure located on the light cut 310 downstream of the separation zone 30.

The second hydrocarbon-based liquid fraction 230 coming from the conversion zone 20 via the second reactor 27, and optionally from the separation zone 29, is optionally mixed with the first excess hydrocarbon-based liquid fraction 120 obtained from the reaction zone 10 which is not used as solvent in the conversion zone 20 and is optionally cooled and directed towards the fractionation zone 30. This zone makes it possible preferentially to separate the hydrocarbon-based liquid fractions into three cuts, namely a light fraction 310 whose final boiling point is preferentially between 250° C. and 325° C., an intermediate fraction 360 whose initial boiling point is preferentially between 250° C. and 325° C. and whose final boiling point is preferentially between 350° C. and 450° C., and at least one heavy fraction 330 whose initial boiling point is preferentially between 350° C. and 450° C. The fractionation zone 30 may thus be constituted by a distillation column containing a top withdrawal, a bottom withdrawal and a side withdrawal, or a sequence of several distillation columns, such as a sequence of a distillation column at atmospheric pressure operating with a top withdrawal and a bottom withdrawal, followed by a distillation column operating under a mild vacuum but which makes it possible to separate the hydrocarbon-based fractions at a temperature of between 350° C. and 450° C. This fractionation zone 30 thus makes it possible to produce an intermediate cut 360, a portion of which may be recycled as liquid solvent 340 into the reaction zone 10 or optionally as additional liquid solvent 350 into the conversion zone 20, the remainder being able to be upgraded as product.

The liquid fractions 310, 360 and 330 which are not recycled are then optionally mixed, before being transported to a processing complex, which is on-site or remote, for performing the refining.

Implementation of the thermal decomposition reactions at a temperature of less than or equal to 425° C. in the used tyre conversion zone, and less than or equal to 450° C. in the waste plastic conversion zone and in the presence of a solvent which promotes the mixing and transfers (heat, material) has two advantages. Firstly, the intermediate cut 360 is composed of at least 40% by weight of molecules, relative to the total weight of the fraction, whose boiling point is greater than 300° C., and preferentially 40% by weight whose boiling point is greater than 350° C. This liquid fraction is essentially composed of olefinic molecules, paraffins and monoaromatics which are easy to convert in conventional refining structures which are equipped with optimized tools such as catalytic cracking, hydrocracking or hydroconversion of petroleum residues. The second advantage is that this liquid fraction is constituted of a very limited fraction of molecules containing polycondensed aromatic rings of at least two rings. Specifically, if the conditions for implementing the process are optimized, the condensed polyaromatic fraction represents less than 15% by weight of the total liquid fraction, preferentially less than 10% by weight of the total liquid fraction.

During the start-up of the facility, in the absence of production of a stabilized intermediate cut, it is possible temporarily to use an imported solvent which will preferentially be constituted of a content of aromatic molecules of greater than 50% by weight relative to the total weight of the cut. This cut may thus be constituted, for example, of conversion effluents from the process of fluid catalytic cracking (FCC) of light cycle oil (LCO) or of heavy cycle oil (HCO), for example.

In order to minimize the energy consumption of the process according to the invention, it is preferable to limit the amount of recycled solvent. Under these conditions, it is preferable for the amount of additional liquid solvent 350 injected into the conversion zone 20 to be minimized. Advantageously, the amount of plastic feedstock 200 is adjusted as a function of the amount of solid feedstock 100 to minimize the amount of additional liquid solvent 350.

EXAMPLES

The examples that follow illustrate preferential embodiments of the process according to the present invention without, however, limiting the scope thereof. The process used for illustrating the invention is in accordance with that described in FIG. 3.

Example 1 (In Accordance with the Invention)

In a first example, the process according to the invention processes 12 000 tonnes/year of used tyre granulates (solid feedstock) free of textile fibres and of metal wires. These granulates, produced by granulators using grinding machines, come from heavy goods vehicle tyres and the grains resulting from the grinding have a size in the region of 2 millimetres. The process also treats 20 000 tonnes/year of plastic films obtained from Economic Activity Waste (EAW) channels, which arrive at the production site in bales containing at least 99% of polyethylene films. These films are first dried and shredded to make pieces not exceeding 10 centimetres in size. The tyre granulates are introduced continuously into a dissolution reactor where they are mixed with the liquid solvent 340 obtained from the recycling of the intermediate cut from the fractionation zone 30. This intermediate cut serves as solvent and has an initial boiling point of about 280° C. and a final boiling point of about 380° C. The amount of solvent that is recycled into the reactor 13 is 36 000 tonnes/year, corresponding to a ratio of solvent/granulate equal to 3 wt/wt. In the reactor 13, the temperature is maintained equal to 260° C., which makes it possible to dissolve the granulates. The liquid fractions and the carbon black in suspension are then directed towards the reactor 14 where the temperature is maintained equal to 390° C. for one hour. On leaving the reactor 14, the hydrocarbon-based liquid fraction is separated from the carbon black using a rotary filter 16 operating at 140° C. Washing of the filtered solid is performed with toluene. The liquid fraction 120 collected at the outlet of section 16, at the bottom of column 18 and at the outlet of section 19 corresponds to a flow rate of 43 178 tonnes/year and is all sent to the conversion zone 20.

In the second part of the process, the shredded and dried plastic films are introduced into the reactor 23 with an extruder heated to 180° C. to melt the plastic. The molten plastic is mixed in the reactor 23 with the 43 178 tonnes/year of hydrocarbon-based liquid fraction 120 produced in the reaction zone 10, to which are added 16 822 tonnes/year of additional liquid solvent 350 recycled from the fractionation zone 30. The total flow rate of solvent, corresponding to the sum of the streams 120 and 350 relative to the flow rate of waste plastic, is thus maintained at a value of 3 wt/wt. The temperature in the reactor 23 is maintained at 200° C. for 30 minutes to terminate the dissolution and to thoroughly mix the molten plastic in the solvent. The liquid effluent obtained is then directed to the reactor 27 where the temperature is maintained equal to 410° C. for 4 hours. The second hydrocarbon-based liquid fraction 230 collected at the outlet of the reactor 27 and at the outlet of section 29, the flow rate of which is 78 830 tonnes/year, is sent to the fractionation zone 30 which produces a light fraction 310 whose final boiling point is 280° C. with a flow rate of 5970 tonnes/year, an intermediate cut 360 whose initial boiling point is 280° C. and whose final boiling point is 380° C., the flow rate of which is 58 232 tonnes/year, of which 5410 tonnes/year are exported as upgraded products and 52 822 tonnes/year are recycled into the reaction zone 10 and the conversion zone 20, and a heavy cut 330 with an initial boiling point of 380° C., the flow rate of which is 14 628 tonnes/year.

To evaluate the net yields in the conversion zone 20, it is considered that the liquid used as solvent (coming from zone 10 or from zone 30) does not react during the thermal decomposition of the plastics in zone 20. Specifically, the liquid used as solvent has already been exposed to thermal degradation conditions under similar conditions and its reactivity is thus greatly reduced.

The operating conditions, the net yields and the real flow rates circulating in zones 10 and 20 are collated in tables 1 and 2 below.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 20/02.955, filed Mar. 26, 2020, are incorporated by reference herein.

TABLE 1

|  |  | Tyre conversion zone 10 | Plastics conversion zone 20 |
|---|---|---|---|
| Operating conditions | | | |
| Feedstock type | | HGV granulates | EAW PE plastic films |
| Feedstock flow rate | t/y | 12000 | 20000 |
| Thermal decomposition temperature | ° C. | 390 | 410 |
| Thermal decomposition residence time | h | 1 | 4 |
| Solvent ratio | wt/wt | 3 | 3 |

TABLE 1-continued

|  |  | Tyre conversion zone 10 | Plastics conversion zone 20 |
|---|---|---|---|
| Net yields |  |  |  |
| Uncondensable gases | t/y | 132 | 690 |
| Carbon black 160 | t/y | 4440 |  |
| Other solids (150; 250) | t/y | 250 | 480 |
| Liquid (ASTM-D2887) |  |  |  |
| Initial point-150° C. | t/y | 1211 | 602 |
| 150-220° C. | t/y | 971 | 936 |
| 220-280° C. | t/y | 911 | 1339 |
| 280-380° C. | t/y | 1659 | 3751 |
| 380-520° C. | t/y | 1747 | 6989 |
| 520° C.-Final point | t/y | 681 | 5212 |

TABLE 2

| | | | | No. of streams | | | | | |
|---|---|---|---|---|---|---|---|---|---|
| Flow rate (t/y) | | 340 | 110 | 120 | 350 | 210 | 230 | 310 | 360 | 330 |
| Gases | | | 132 | | | 690 | | | | |
| Liquid (ASTM-D2887) | Initial point-150° C. | | 1211 | | | 1813 | 1813 | | | |
| | 150-220° C. | | 971 | | | 1907 | 1907 | | | |
| | 220-280° C. | | 911 | | | 2250 | 2250 | | | |
| | 280-380° C. | 36000 | | 37659 | 16822 | 58232 | | | 58232 | |
| | 380-520° C. | | 1747 | | | 8735 | | | | 8735 |
| | 520° C.-Final point | | 681 | | | 5893 | | | | 5893 |
| Total | | 36000 | 132 | 43178 | 16822 | 690 | 78830 | 5970 | 58232 | 14628 |

In table 3 below, the compositions of the first hydrocarbon-based liquid fraction as net (i.e. without integrating the recycling of the intermediate cut) and as real (i.e. integrating the recycling of the intermediate cut), in the used-tyre upgrading section are compared.

TABLE 3

| | Tyre conversion zone 10 | | Plastics conversion zone 20 | |
|---|---|---|---|---|
| Simulated distillation ASTM-D2887 | Liquid without solvent recycling | Liquid with solvent recycling | Liquid without solvent recycling | Liquid with solvent recycling |
| | wt % relative to the total weight of the liquid fraction | | | |
| T < 150° C. | 17% | 3% | 3% | 2% |
| T < 220° C. | 30% | 5% | 8% | 5% |
| T < 280° C. | 43% | 7% | 15% | 8% |
| T < 380° C. | 66% | 94% | 35% | 81% |
| T < 520° C. | 91% | 98% | 72% | 93% |

It is found that the recycling of the intermediate cut 360 makes it possible to very significantly lighten the composition of the liquid present in the reactors. Thus, at the outlet of the reaction zone 10, in the net hydrocarbon-based liquid fraction (corresponding to the production of liquid by decomposition of tyres without integrating the recycling of solvent), the fraction below 380° C. (corresponding to atmospheric distillates) corresponds to only 66% by weight relative to the total weight of the liquid fraction, whereas said fraction is 94% by weight during the recycling of the intermediate cut 360 as liquid solvent 340. Similarly, it is found that the liquid fraction with an initial boiling point of greater than 520° C., which corresponds to a residue that is undistillable, even under vacuum, is 9% by weight in the net liquid, but is only 2% by weight during the recycling of the intermediate cut 360 as liquid solvent 340. Placing of the liquid solvent obtained from the intermediate cut in contact in the reactor makes it possible to reduce the proportion of heavy fractions and this thus facilitates the transfers and the stirring, notably by lowering the viscosity of the reaction medium.

In table 3, the compositions of the second hydrocarbon-based liquid fraction as net (i.e. without integrating the recycling of the intermediate cut) and as real (i.e. integrating the recycling of the intermediate cut), for the waste plastic conversion zone 20 are also compared. It is found that the recycling of the intermediate cut 360 makes it possible to very significantly lower the boiling curve of the liquid present in the reactors 23 and 27. Thus, at the outlet of the conversion zone 20 for the thermal decomposition of the waste plastics, in the second net hydrocarbon-based liquid fraction (i.e. corresponding to the production of liquid by decomposition of the plastic without integrating the recycling of additional liquid solvent), the fraction below 380° C. (corresponding to atmospheric distillates) corresponds to only 35% by weight relative to the total weight of the liquid fraction, whereas said fraction is 81% by weight during the recycling of the intermediate cut as liquid solvent 340 and additional liquid solvent 350. Similarly, it is found that the portion above 520° C., which corresponds to a residue that is undistillable, even under vacuum, is 28% by weight in the second net hydrocarbon-based liquid fraction, but is only 7% by weight during the recycling. The placing in contact of the first hydrocarbon-based liquid fraction with the molten plastic feedstock in the conversion zone 20 makes it possible to reduce the proportion of heavy fractions and this thus facilitates the transfers and the stirring, notably by lowering the viscosity. In the case of waste plastics, the effect is further amplified by the fact that the aromatic content of the first hydrocarbon-based liquid fraction (acting as solvent) is substantial, whereas the molecules resulting from the thermal degradation of the polyolefins are essentially paraffins and linear or sparingly branched olefins.

Analysis of the products formed shows that the content of monoaromatic products in the hydrocarbon-based liquid fraction resulting from the thermal decomposition of the tyres is 38% by weight relative to the total weight of the liquid fraction, and that the content of molecules containing polycondensed aromatic rings (essentially diaromatics) is 6% by weight. The analysis also shows that the bulk of the liquid products resulting from the thermal decomposition of the waste plastics essentially contain paraffins and olefins, the aromatic content being less than 3% by weight.

Under these conditions, the hydrocarbon-based liquid fractions resulting from the thermal degradation of the used tyres and of the waste plastics contain between 10% and 11% by weight of monoaromatic products and between 1.5% and 2% by weight of molecules containing polycondensed aromatic rings (essentially diaromatics) relative to the total weight of said liquid fractions.

Example 2 (In Accordance with the Invention)

Relative to example 1, one portion of the hydrocarbon-based liquid fraction 120 produced in the reaction zone 10 is sent into the conversion zone 20, the other portion being sent into the fractionation zone 30.

In the second example, the process according to the invention processes 15 000 tonnes/year of used tyre granulates free of textile fibres and metal wires. These granulates, produced by granulators using grinding machines, come from heavy goods vehicle tyres and the grains resulting from the grinding have a size in the region of 2 millimetres. The process also treats 15 000 tonnes/year of plastic films obtained from Economic Activity Waste (EAW) channels, which arrive at the production site in bales containing at least 99% by weight of polyethylene films. These films are also dried and shredded to make pieces not exceeding 10 centimetres in size. The tyre granulates are introduced continuously into a dissolution reactor where they are mixed with the liquid solvent 340 obtained from the recycling of the intermediate cut from the fractionation zone 30. This intermediate cut serves as solvent and has an initial boiling point of about 280° C. and a final boiling point of about 380° C. The amount of solvent that is recycled into the reactor 13 is 45 000 tonnes/year, corresponding to a ratio of solvent/granulate equal to 3 wt/wt. In the reactor 13, the temperature is maintained equal to 260° C., which makes it possible to dissolve the granulates. The liquid fractions and the carbon black in suspension are then directed towards the reactor 14 where the temperature is maintained equal to 390° C. for one hour. On leaving the reactor 14, the hydrocarbon-based liquid fraction is separated from the carbon black using a rotary filter 16 operating at 140° C. Washing of the filtered solid is performed with toluene. The liquid fraction 120 collected at the outlet of section 16, at the bottom of column 18 and at the outlet of section 19 corresponds to a flow rate of 54 035 tonnes/year and is sent partly to the conversion zone 20 and partly to the fractionation zone 30.

In the second part of the process, the shredded and dried plastic films are introduced into the reactor 23 with an extruder heated to 140° C. to melt the plastic. It is desired to mix the plastic with a solvent in a solvent/plastic ratio of 3, as in example 1, which requires the introduction of 45 000 tonnes/year of hydrocarbon-based liquid fraction 120 produced in the reaction zone 10, the remaining flow rate being sent into the fractionation zone 30. It is thus not necessary here to recycle a portion of the intermediate cut 360 produced in section 30 as additional liquid solvent 350. The total flow rate of solvent corresponding to the stream 120 sent to the conversion zone 20, relative to the flow rate of waste plastic, is thus at a value of 3 wt/wt. The temperature in the reactor 23 is maintained at 180° C. for 30 minutes to terminate the dissolution and to thoroughly mix the molten plastic in the solvent. The liquid effluent obtained is then directed to the reactor 27 where the temperature is maintained equal to 410° C. for 4 hours. The second hydrocarbon-based liquid fraction 230 at the outlet of the reactor 27, the flow rate of which is 59 123 tonnes/year, is sent to the fractionation zone 30 which produces a light fraction 310 whose final boiling point is 280° C. with a flow rate of 6051 tonnes/year, an intermediate cut 360 whose initial boiling point is 280° C. and whose final boiling point is 380° C., the flow rate of which is 49 901 tonnes/year, of which 4901 tonnes/year are exported as upgraded products and 45 000 tonnes/year are recycled into the reaction zone 10 and a heavy cut 330 with an initial boiling point of 380° C., the flow rate of which is 12 206 tonnes/year.

To evaluate the net yields in the conversion zone 20, it is considered that the liquid used as solvent (coming from zone 10 or from zone 30) does not react during the thermal decomposition of the plastics in zone 20. Specifically, the liquid used as solvent has already been exposed to thermal degradation conditions under similar conditions and its reactivity is thus greatly reduced.

The operating conditions, the net yields and the real flow rates circulating in zones 10 and 20 are collated in tables 4 and 5 below.

TABLE 4

|  |  | Tyre conversion zone 10 | Plastics conversion zone 20 |
|---|---|---|---|
| Operating conditions |  |  |  |
| Feedstock type |  | HGV granulates | EAW PE plastic films |
| Feedstock flow rate | t/y | 15000 | 15000 |
| Thermal decomposition temperature | ° C. | 390 | 410 |
| Thermal decomposition residence time | h | 1 | 4 |
| Solvent ratio | wt/wt | 3 | 3 |
| Net yields |  |  |  |
| Gases | t/y | 165 | 518 |
| Carbon black 160 | t/y | 5550 |  |
| Other solids (150; 250) | t/y | 250 | 360 |
| Liquid (ASTM-D2887) |  |  |  |
| Initial point-150° C. | t/y | 1524 | 452 |
| 150-220° C. | t/y | 1222 | 702 |
| 220-280° C. | t/y | 1147 | 1005 |
| 280-380° C. | t/y | 2088 | 2813 |
| 380-520° C. | t/y | 2198 | 5242 |
| 520° C.-Final point | t/y | 857 | 3909 |

TABLE 5

| | | | | | 120 to zone 20 | 120 to zone 30 | | | | | |
|---|---|---|---|---|---|---|---|---|---|---|---|
| Flow rate (t/y) | | 340 | 110 | 120 | 20 | 30 | 210 | 230 | 310 | 360 | 330 |
| Gases | | | | | 165 | | | 518 | | | |
| Liquid (ASTM- | Initial point-150° C. | | | 1524 | 1269 | 255 | | 1721 | 1976 | | |
| | 150-220° C. | | | 1222 | 1017 | 204 | | 1719 | 1924 | | |

TABLE 5-continued

| | | | | No. of streams | | | | | | | |
|---|---|---|---|---|---|---|---|---|---|---|---|
| | Flow rate (t/y) | 340 | 110 | 120 | 120 to zone 20 | 120 to zone 30 | 210 | 230 | 310 | 360 | 330 |
| D2887) 220-280° C. | | | | 1147 | 955 | 192 | | 1959 | 2151 | | |
| 280-380° C. | | 45000 | | 47088 | 39214 | 7873 | | 42028 | | 49901 | |
| 360-520° C. | | | | 2198 | 1831 | 368 | | 7072 | | | 7440 |
| 520° C.-Final point | | | | 857 | 713 | 143 | | 4623 | | | 4766 |
| Total | | 45000 | 165 | 54035 | 45000 | 9035 | 518 | 59123 | 6051 | 49901 | 12206 |

In table 6 below, the compositions of the first hydrocarbon-based liquid fraction as net (i.e. without integrating the recycling of the intermediate cut) and as real (i.e. integrating the recycling of the intermediate cut), in the used tyre upgrading section are compared.

TABLE 6

| | Tyre conversion zone 10 | | Plastics conversion zone 20 | |
|---|---|---|---|---|
| Simulated distillation ASTM-D2887 | Liquid without solvent recycling | Liquid with solvent recycling | Liquid without solvent recycling | Liquid with solvent recycling |
| | wt % relative to the total weight of the liquid fraction | | | |
| T < 150° C. | 17% | 3% | 3% | 3% |
| T < 220° C. | 30% | 5% | 8% | 6% |
| T < 280° C. | 43% | 7% | 15% | 9% |
| T < 380° C. | 66% | 94% | 35% | 80% |
| T < 520° C. | 91% | 98% | 72% | 92% |

It is found that the recycling of the intermediate cut 360 makes it possible to very significantly lighten the composition of the liquid present in the reactors. Thus, at the outlet of the reaction zone 10, in the net hydrocarbon-based liquid fraction (corresponding to the production of liquid by decomposition of tyres without integrating the recycling of solvent), the fraction below 380° C. (corresponding to atmospheric distillates) corresponds to only 66% by weight relative to the total weight of the liquid fraction, whereas said fraction is 94% by weight during the recycling of the intermediate cut 360 as liquid solvent 340. Similarly, it is found that the liquid fraction with an initial boiling point of greater than 520° C., which corresponds to a residue that is undistillable, even under vacuum, is 9% by weight in the net liquid, but is only 2% by weight during the recycling of the intermediate cut 360 as liquid solvent 340. Placing of the liquid solvent obtained from the intermediate cut in contact in the reactor makes it possible to reduce the proportion of heavy fractions and this thus facilitates the transfers and the stirring, notably by lowering the viscosity of the reaction medium.

In table 6, the compositions of the second hydrocarbon-based liquid fraction as net (i.e. without integrating the recycling of the intermediate cut) and as real (i.e. integrating the recycling of the intermediate cut), for the waste plastic conversion zone 20 are also compared. It is found that the recycling of the intermediate cut 360 makes it possible to very significantly lower the boiling curve of the liquid present in the reactors 23 and 27. Thus, at the outlet of the conversion zone 20 for the thermal decomposition of the waste plastics, in the second net hydrocarbon-based liquid fraction (i.e. corresponding to the production of liquid by decomposition of the plastic without integrating the recycling of additional liquid solvent), the fraction below 380° C. (corresponding to atmospheric distillates) corresponds to only 35% by weight relative to the total weight of the liquid fraction, whereas said fraction is 80% by weight during the recycling of the intermediate cut as liquid solvent 340. Similarly, it is found that the portion above 520° C., which corresponds to a residue that is undistillable, even under vacuum, is 28% by weight in the second net hydrocarbon-based liquid fraction, but is only 8% by weight during the recycling. The placing in contact of the first hydrocarbon-based liquid fraction with the molten plastic feedstock in the conversion zone 20 makes it possible to reduce the proportion of heavy fractions and this thus facilitates the transfers and the stirring, notably by lowering the viscosity. In the case of waste plastics, the effect is further amplified by the fact that the aromatic content of the first hydrocarbon-based liquid fraction (acting as solvent) is substantial, whereas the molecules resulting from the thermal degradation of the polyolefins are essentially paraffins and linear or sparingly branched olefins.

Analysis of the products formed shows that the content of monoaromatic products in the hydrocarbon-based liquid fraction resulting from the thermal decomposition of the tyres is 38% by weight relative to the total weight of the liquid fraction, and that the content of molecules containing polycondensed aromatic rings (essentially diaromatics) is 6% by weight. The analysis also shows that the bulk of the liquid products resulting from the thermal decomposition of the waste plastics essentially contain paraffins and olefins, the aromatic content being less than 3% by weight.

Under these conditions, the hydrocarbon-based liquid fractions resulting from the thermal degradation of the used tyres and of the waste plastics contain between 14% and 15% by weight of monoaromatic products and between 2.0% and 2.5% by weight of molecules containing polycondensed aromatic rings (essentially diaromatics) relative to the total weight of said liquid fractions.

By comparing the results of example 1 and of example 2, it is found that although the amounts processed are different, and although the way of adjusting the solvent is different in the two examples, the benefits associated with the implementation of the process according to the invention with recycling of the solvent remain similar.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for converting a plastic feedstock and for converting used tyres to obtain carbon black, comprising at least the following steps:
   a) a solid feedstock (100) based on used tyres is sent into a reaction zone (10) in the presence of a liquid solvent (340) comprising aromatic compounds to at least partly dissolve said solid feedstock and to thermally decompose at a temperature of less than or equal to 425° C. said at least partially dissolved solid feedstock so as to obtain at least carbon black (160) and a first hydrocarbon-based liquid fraction (120);
   b) a molten plastic feedstock (200) is sent together with at least a portion of the first hydrocarbon-based liquid fraction (120) obtained on conclusion of step a) into a conversion zone (20) to at least partly dissolve said molten plastic feedstock (200) and to thermally decompose at a temperature of less than or equal to 450° C. said partially dissolved plastic feedstock so as to obtain at least partly a second hydrocarbon-based liquid fraction (230);
   c) the first hydrocarbon-based liquid fraction (120) obtained from step a) is at least partly sent to a fractionation zone (30) to obtain at least one intermediate hydrocarbon cut (360) whose initial boiling point is between 250 and 325° C. and whose final boiling point is between 350 and 450° C., a light cut and a heavy cut; and
   d) a fraction of the intermediate hydrocarbon cut (360) is at least partly sent to the reaction zone (10) of step a) as liquid solvent (340), wherein a portion of the first hydrocarbon-based liquid fraction (120) from step a is provided to step b and a portion of a first hydrocarbon-based liquid fraction (120) is provided to step c.

2. Process according to claim 1, in which said first hydrocarbon-based liquid fraction (120) has a content of aromatic compounds of between 30% and 70% by weight relative to the total weight of said first hydrocarbon-based liquid fraction.

3. Process according to claim 1, in which said intermediate hydrocarbon cut (360) has a content of aromatic compounds of between 30% and 70% by weight relative to the total weight of said intermediate hydrocarbon cut.

4. Process according to claim 1, in which a portion of the second hydrocarbon-based liquid fraction (230) is sent to the fractionation zone (30).

5. Process according to claim 1, in which a fraction of the intermediate hydrocarbon cut (360) is at least partly sent to the conversion zone (20) as additional liquid solvent (350).

6. Process according to claim 1, in which the intermediate hydrocarbon cut (360) is at least partly sent to an aromatic compound enrichment unit (40) to obtain a stream rich in aromatic compounds (410) and a stream depleted in aromatic compounds (420), said stream rich in aromatic compounds (410) being sent into the reaction zone (10) as liquid solvent (340).

7. Process according to claim 6, in which said stream rich in aromatic compounds (410) is at least partly sent to the conversion zone (20) as additional liquid solvent (350).

8. Process according to claim 6, wherein said aromatic compound enrichment unit (40) is chosen from units for extraction with the solvent furfural, phenol or N-methyl-2-pyrrolidone.

9. Process according to claim 1, in which said plastic feedstock is a mixture of plastics containing at least 90% by weight of polyolefins and of polystyrene relative to the total weight of said feedstock.

10. Process according to claim 1, in which the first hydrocarbon-based liquid fraction (120) and/or the second hydrocarbon-based liquid fraction (230) comprises at least 40% by weight of compounds whose initial boiling point is greater than 300° C.

11. Process according to claim 1, in which the ratio between the flow rate of the liquid solvent (340) and the flow rate of said solid feedstock (100) that are injected into the reaction zone (10) is between 1 and 10 weight/weight.

12. Process according to claim 5, in which the ratio between the sum of the flow rates of the hydrocarbon-based liquid fraction (120) and the additional liquid solvent (350) divided by the flow rate of the molten plastic feedstock (200) is between 1 and 10 weight/weight.

13. Process according to claim 1, in which step a) comprises the following substeps:
   a1) said solid feedstock (100) and said liquid solvent (340) are sent into a first stirred reactor (13) to at least partly dissolve said solid feedstock (100);
   a2) said at least partly dissolved solid feedstock obtained on conclusion of step a1) is sent into a second stirred reactor (14) to thermally decompose at a temperature of less than or equal to 425° C. said solid feedstock and to obtain a liquid effluent containing carbon black particles in suspension;
   a3) said liquid effluent obtained on conclusion of step a2) is cooled to a temperature of less than 150° C.;
   a4) the carbon black particles are filtered off, washed and separated from the cooled liquid effluent obtained on conclusion of step a3) to obtain carbon black (160) and a first hydrocarbon-based liquid fraction (120).

14. Process according to claim 1, in which step b) comprises the following substeps:
   b1) said molten plastic feedstock (200) and at least a portion of the first hydrocarbon-based liquid fraction (120) are sent into a first stirred reactor (23) to at least partly dissolve said molten plastic feedstock;
   b2) said at least partly dissolved plastic feedstock obtained on conclusion of step b1) is sent into a second stirred reactor (27) to thermally decompose at a temperature of less than or equal to 425° C. said plastic feedstock and at least partly to obtain a second hydrocarbon-based liquid fraction (230).

* * * * *